Patented Dec. 11, 1945

2,390,551

UNITED STATES PATENT OFFICE 2,390,551

UNSATURATED ESTER-AMIDES

Irving E. Muskat, Glenside, Pa., and Franklin Strain, Norton Center, Ohio, assignors to Pittsburgh Plate Glass Company, Pittsburgh, Pa, a corporation of Pennsylvania No Drawing. Application July 10, 1943, Serial No. 494,264

7 Claims. (Cl. 260—463)

This application relates to a new class of unsaturated ester-amides capable of polymerization to valuable resins as are described herein. In an earlier filed application, Serial No. 361,280 we have described and claimed analogous compounds made by reacting polyhydroxy compounds with unsaturated chloroformates. In the aforesaid application we also describe unsaturated ester amides prepared by the reaction of alcohols or other amine-hydroxy substituted hydrocarbons with unsaturated chloroformates. Accordingly, the present application, directed to the latter type compounds is a continuation-in-part of Serial No. 361,280 filed by us on October 15, 1940.

The new compounds are ester amides derived by the reaction of amino alcohols or other amino-hydroxy substituted hydrocarbons with unsaturated chloroformates. They may be represented by the structural formula:

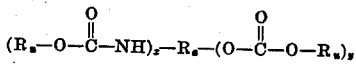

in which $R_u$ is a radical of an unsaturated alcohol and $R_a$ is a hydrocarbon radical to which $x$ amino groups and $y$ hydroxyl groups of the amino alcohol are attached.

Suitable unsaturated alcohols for use in the preparation of the new esters are the monohydric alcohols which have the hydroxy group attached to a carbon atom in a straight chain and an unsaturated linkage between the second and third chain carbon atom. Thus, allyl, methallyl, chloroallyl, cinnamyl, propargyl, crotyl, ethylallyl, phenylpropargyl, chlorocrotyl, bromoallyl, etc. alcohols will form esters capable of polymerization.

The amino-hydroxy substituted hydrocarbons may be either liquids such as ethanol amine, aminoisopropyl alcohol, 1-hydroxy 3-amino propane, the aminobutyl alcohols, etc. or they may be solids such as ammeline, aminophenol, aminoisovaleric alcohol, aminocresol, 2-amino-2-methyl-1,3-propanediol, 2 - amino - 2-methyl-1-propanol, etc.

The new compounds may be prepared preferably in liquid phase by reacting liquid amino-hydroxy substituted compounds or a solution of a solid amino-hydroxy compound in a suitable solvent with a chloroformate of the desired unsaturated monohydric alcohol. The chloroformates are first prepared by the reaction of alcohol with phosgene in a neutral or slightly acid solution while being cooled to prevent excess elevation in temperature due to the heat of reaction. The phosgene is added in liquid or in gaseous form to the reaction mixture or it may be dissolved in a recycling stream of chloroformate to which the alcohol is subsequently added. The chloroformates are thereafter reacted with the amino-hydroxy substituted compound in the presence of an excess of pyridine or other cyclic tertiary amine or a hydroxide, oxide or carbonate of an alkali or alkaline earth metal. This reaction may be conducted by adding the chloroformate slowly to the mixture of amino compound and alkaline agent or by mixing the chloroformate and amino-compound and adding the alkaline agent slowly. During the reaction a temperature below 20° C. and preferably below 10° C. is required for most satisfactory results and is obtained by surrounding the reaction chamber with a suitable cooling medium. For the purpose of obtaining intimate admixture of the reagents and to avoid local overheating of the reaction mixture a mechanical stirring device should be used. After the reagents are combined the cooling and stirring is continued until the reaction is complete. Usually about one hour will suffice. When the reaction is complete the product is washed with dilute hydrochloric acid to neutralize the excess pyridine or other alkaline agent. Washing with water and drying over anhydrous salts, such as sodium sulphate, will yield a relatively pure liquid compound. Further purification by distillation or by moderate heating to eliminate the more volatile impurities may be undertaken if the boiling points and thermal stabilities will permit.

The same compositions may alternatively be prepared by reacting the liquid amino compound or a solution of a solid amino compound with phosgene to prepare intermediates having the following molecular structure:

which may subsequently be reacted with a suitable unsaturated alcohol. The reactions are generally conducted in cold solutions and the heat of reaction is dissipated by vigorous stirring with the reaction vessel in contact with a cooling medium. During the reaction an alkaline reagent must be present. However, the reagents should be so combined that there is at no time a substantial excess of alkaline reagent in the presence of either the chloroformate or the final ester amide. Thus, the alcohol and alkaline reagent mixture may be added slowly to the chloroformate or the alkaline reagent may be added slowly to a mixture of alcohol and chloroformate or separate streams of alkaline reagent and one other reactant may be simultaneously added in stoichiometric proportions to the third reactant.

Further details of the preparation are set forth below in specific examples.

Example I

A mixture of 109 gms. of o-aminophenol, 85 gms. of pyridine and 1500 cc. of benzene was placed in a two liter flask provided with a dropping funnel, a thermometer and a mechanical stirring device. The reaction vessel was surrounded by a bath of an ice-salt mixture and cooled to about 0° C. Allyl chloroformate prepared by reacting allyl alcohol with phosgene was added through the dropping funnel at the rate of 2 to 3 gms. per minute for the first ten minutes while stirring rapidly. Thereafter the rate of addition was increased, but at all times was such that the reaction temperature remained below 10° C. After 260 gms. of allyl chloroformate had been added the addition was stopped but the reaction mixture was stirred for an additional hour to complete the reaction. The mixture was washed with dilute hydrochloric acid and with water until neutral. The ester-amide was heated at a pressure of 10 to 30 mm. to a temperature slightly below the boiling point to vaporize the more volatile impurities. A new compound having the following structure was thus obtained:

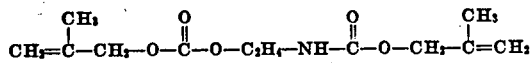

Example II

Phosgene was bubbled into a flask containing methallyl alcohol at a rate of 20 millimoles per minute while agitating the mixture and cooling to a temperature below about 10° C. After phosgene in the proportion of about 0.8 moles of phosgene per mole of methallyl alcohol had been introduced, the mixture was allowed to stand for one hour. Thereafter, the reaction mixture was washed with water and methallyl chloroformate was recovered. This compound has an index of refraction at 20° C. of 1.4^7 and a boiling point of approximately 130° C. at atmospheric pressure.

A 130 gm. portion of the methallyl chloroformate was mixed with 29 gms. of ethanol-amine at 5° C. in a 500 cc. reaction flask. About 85 cc. of 50% caustic soda was slowly added through a dropping funnel at a rate which enabled the cooling mixture surrounding the reaction vessel to hold the reaction temperature below 12° C. The mixture was stirred during the caustic addition and for one hour after it was completed. When the reaction ceased the mixture was neutralized with hydrochloric acid and washed with sodium sulphate solution. The liquid ester amide was dryed over anhydrous sodium sulphate and purified by distillation.

The following compound was thus prepared:

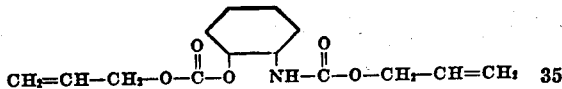

Example III

A 122 gm. portion (2 moles) of ethanol amine was placed in a reaction flask provided with a thermometer, a stirring mechanism and a conduit tube for admitting gaseous phosgene below the liquid level. The flask was submerged in an ice bath and cooled to 10° C. Phosgene was bubbled through the ethanol amine at the rate of 50 millimoles per minute for 90 minutes at which time the reaction was substantially complete. The reaction mass was permitted to stand over night. The excess phosgene was removed by heating to 40° C. under a reduced pressure (50 to 100 mm.). The product was treated with a mixture of 110 gms. (slight excess) of allyl alcohol and 150 gms. of pyridine by adding the mixture at the rate of 3 to 5 gms. per minute for the first twenty minutes, 5 to 10 gms. per minute for the next twenty minutes and the balance at 15 to 20 gms. per minute. During the reaction, the flask contents were stirred vigorously while the flask was submerged in a freezing mixture of salt and ice. The temperature of the reaction mass varied between +8° C. and +16° C. during the reaction. The ester amide was purified as in Example I and was found to have the chemical structure:

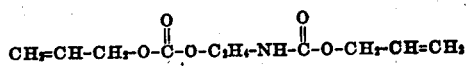

The new compounds are true chemical compositions having distinct melting and boiling points. They are capable of separation from the impurities by reason of these distinct physical constants.

The new materials have two active polymerizable groups which render them useful in the preparation of resinous materials. When activated by ultraviolet light or by heat in the presence of a suitable polymerization catalyst such as organic peroxides, organic percarbonates or hydrogen peroxide the ester amide molecules combine to form macromolecular structures. The polymerization transforms the liquid compounds first into viscous liquids, then into soft solids and finally into hard strong solids. Compounds which are crystalline solids are converted into strong resinous solids at temperatures above their melting points. When the ester-amides are prepared in pure form the polymers are clear and substantially colorless.

The ester amides are suitable for casting, for the preparation of coating compositions and for the preparation of impregnating and waterproofing compositions.

Although in the final state of polymerization the ester-amides are neither soluble nor fusible, intermediate polymers may be prepared which are both soluble in organic solvents and fusible under moderate pressures and temperatures. These are generally prepared by partial polymerization and separation of unpolymerized compound from the polymer. Such intermediate polymers may be mixed with fillers, pigments, dyes, and fibrous reinforcing materials to produce a wide variety of useful products well known in the art of synthetic plastics.

It is apparent that the materials may be used for any of the many known uses for thermosetting resins and for some of the uses known for thermoplastic resins.

This application is a continuation-in-part of Serial No. 361,280 filed October 15, 1940.

Although this application is described by detailed examples, it is not intended that these details shall be limitations upon the scope of the invention except as incorporated in the claims.

We claim:

1. A neutral ester-amide of A an amino-hydroxy substituted hydrocarbon and B a half ester of carbonic acid and a monohydric alcohol having the hydroxy group attached to a carbon atom in a straight chain and an unsaturated linkage between the second and the third chain carbon atom.

2. The compound of claim 1 in which the amino-hydroxy substituted hydrocarbon is an amino-alcohol.

3. The compound of claim 1 in which the unsaturated alcohol is allyl alcohol.

4. The neutral ester-amide of A aminophenol and B a half ester of carbonic acid and allyl alcohol.

5. A neutral ester-amide of A ethanolamine and B a half ester of carbonic acid and methallyl alcohol.

6. The neutral ester-amide of A ethanolamine and B a half ester of carbonic acid and allyl alcohol.

7. The compound of claim 1 in which the amino-hydroxy substituted hydrocarbon is ethanolamine.

IRVING E. MUSKAT.
FRANKLIN STRAIN.